Figure 1:
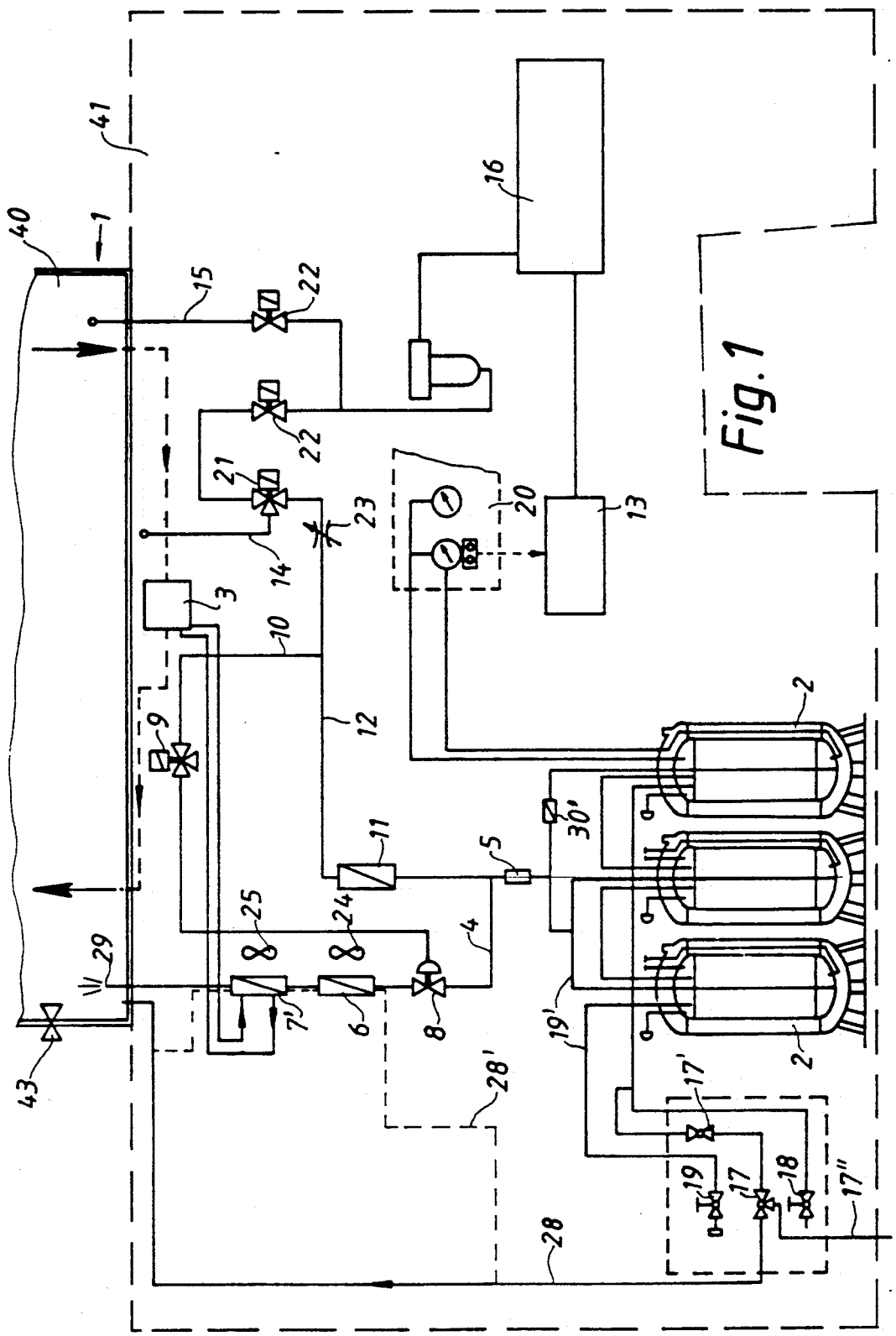

United States Patent [19]

Wassibauer et al.

[11] Patent Number: 5,172,558

[45] Date of Patent: Dec. 22, 1992

[54] COOLING PROCESS AND REFRIGERATED CONTAINER

[75] Inventors: Rüdiger Wassibauer, Puch; Werner Russ, Altenmarkt, both of Austria

[73] Assignee: Franz Welz Internationale Transporte GmbH, Austria

[21] Appl. No.: 613,828

[22] PCT Filed: Aug. 4, 1989

[86] PCT No.: PCT/AT89/00070

§ 371 Date: Feb. 4, 1991

§ 102(e) Date: Feb. 4, 1991

[87] PCT Pub. No.: WO90/01661

PCT Pub. Date: Feb. 22, 1990

[30] Foreign Application Priority Data

Aug. 4, 1988 [AT] Austria ................... 1968/88

[51] Int. Cl.⁵ ............................... F24F 3/16
[52] U.S. Cl. ......................... 62/78; 62/50.2; 426/418
[58] Field of Search ............. 62/53.2, 50.2, 333, 62/238.6, 78; 426/418, 419

[56] References Cited

U.S. PATENT DOCUMENTS

| | | |
|---|---|---|
| 3,239,360 | 3/1966 | Dixon . |
| 3,360,380 | 12/1967 | Bedrosian et al. .......... 62/78 |
| 3,421,336 | 1/1969 | Lichtenberger et al. ..... 62/53.2 |
| 3,487,769 | 4/1965 | Dixon . |
| 3,535,210 | 10/1970 | Linde et al. ............ 62/333 |
| 3,705,500 | 12/1972 | Jehle ................... 62/53.2 |
| 3,830,078 | 8/1974 | Read ...................... 62/78 |
| 4,315,413 | 2/1982 | Baker . |
| 4,454,723 | 6/1984 | Weasel, Jr. ............... 62/78 |
| 4,485,633 | 12/1984 | King et al. . |
| 4,566,282 | 1/1986 | Knoblauch et al. .......... 62/78 |
| 4,727,727 | 3/1988 | Reedy ................... 62/238.6 |
| 4,833,892 | 5/1989 | Wassibauer et al. ......... 62/78 |

FOREIGN PATENT DOCUMENTS

| | | |
|---|---|---|
| 2773167 | 4/1969 | Australia . |
| 384668B | 12/1987 | Austria . |
| 0126996 | 12/1984 | European Pat. Off. . |
| 0136042 | 4/1985 | European Pat. Off. . |
| 0224469 | 6/1987 | European Pat. Off. . |
| 0235119 | 9/1987 | European Pat. Off. . |
| 1954914 | 4/1970 | Fed. Rep. of Germany . |
| 1601874 | 2/1971 | Fed. Rep. of Germany . |
| 2330608 | 6/1977 | France . |

Primary Examiner—Ronald C. Capossela
Attorney, Agent, or Firm—Wood, Herron & Evans

[57] ABSTRACT

The invention relates to a cooling process and to a refrigerated container into which nitrogen is delivered, which nitrogen is transported in liquid form in containers with the refrigerated container, at least one cooling system being provided in order to cool the atmosphere of the refrigerated container (1). According to the invention it is provided that the atmosphere is circulated via the cooling system (3) for periods of time given by a control means (13) by at least one blower (44), and that at least one means (6,7,7') for warming the nitrogen before supplying it into the cool room (40), of the refrigerated container (1) is provided, by means of which the nitrogen can be warmed to a temperature substantially corresponding to the temperature within the cool room (40), preferably being only slightly lower than this temperature.

22 Claims, 3 Drawing Sheets

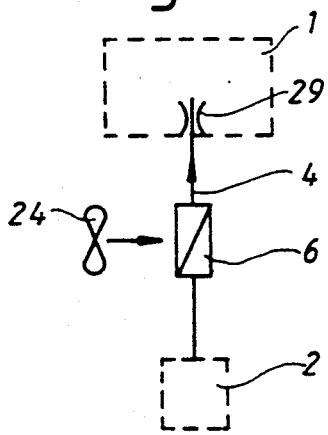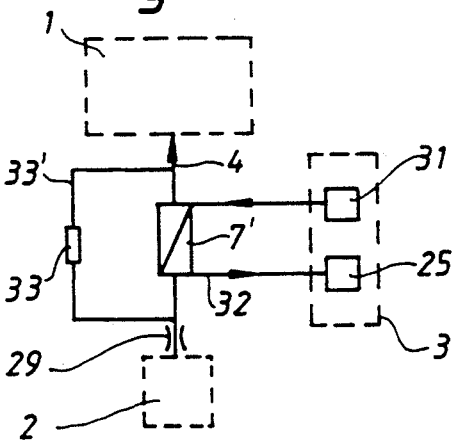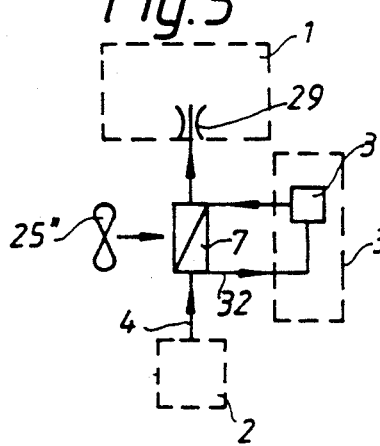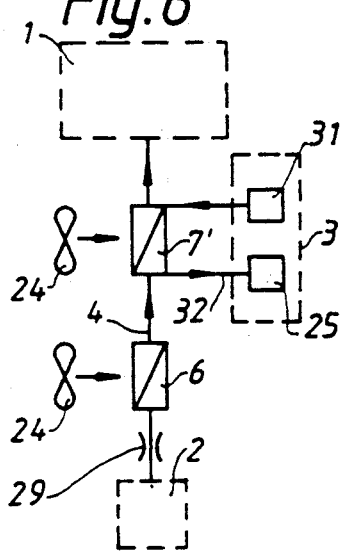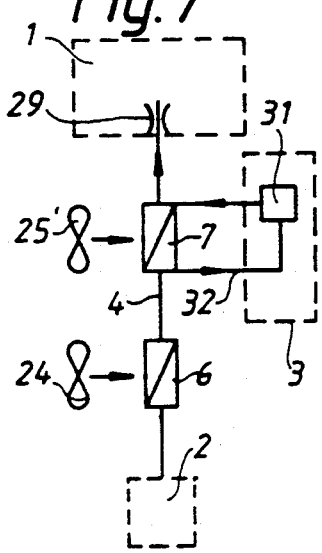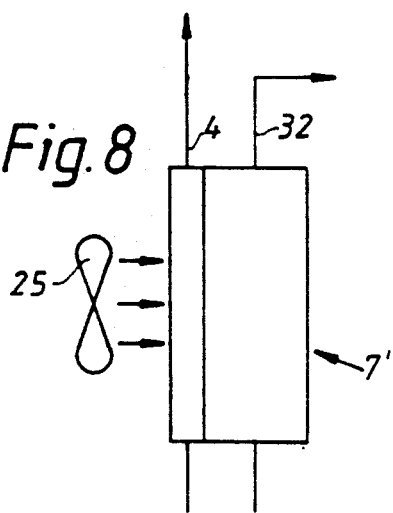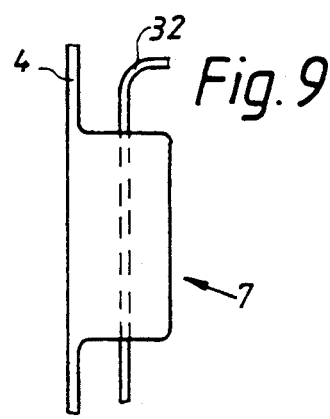

COOLING PROCESS AND REFRIGERATED CONTAINER

The invention relates to a refrigerated container, in particular a refrigerated container for the transportation, respectively, storage of goods into which in particular in order to maintain the composition of the atmosphere, nitrogen is delivered which is carried in liquid form in containers with the refrigerated container, at least one cooling system being provided to cool the atmosphere of the refrigerated container. Further, the invention relates to a cooling process for refrigerated containers, in particular refrigerated containers for transporting, respectively, storing goods, into which, in particular, in order to maintain the atmospheric composition nitrogen is delivered, this nitrogen being carried in containers in liquid form with the refrigerated container, the atmosphere of the refrigerated container being cooled by means of at least one cooling system.

An arrangement of the described kind is known, for example, in the AU-PS 27731/07. This arrangement, however, does not show adequate measures for cooling in an energy- and gas saving, respectively, ware-protecting manner.

It is the object of the invention to ensure that, in refrigerated containers of this kind, a most even atmospheric composition at a most even temperature for the longest possible period of time can be maintained; particularly, the storage time is to be increased when the goods stored in the refrigerated container are of higher quality. Such refrigerated containers are, in particular, thought to be constructed as superstructures on trucks or rail cars, or to be loaded on ships and transported therewith. Such refrigerated containers are used in particular for transporting perishable goods, such as food stuffs, flowers, meat, vegetables, fruit, but also for chemicals, pharmaceutical preparations and other goods that require a specific atmospheric composition and/or temperature when being transported.

According to the invention a refrigerated container of the initially mentioned kind is characterized in that the atmosphere is circulated via the cooling system during periods of time determined by a control system by means of at least one blower means and that at least one means for heating the nitrogen before its introduction into the cooling room of the refrigerated container is provided, with which means the nitrogen can be heated to a temperature that substantially corresponds to the temperature in the cool room, preferably is only somewhat lower than this. A process of the initially described kind is according to the invention characterized in that the atmosphere is circulated during predetermined periods of time for cooling, and that the nitrogen is heated before it is fed into the cool room of the refrigerated container to a temperature corresponding substantially to the temperature in the cool room, preferably is only slightly lower than that.

The blower means for circulating the atmosphere in the interior of the container is a blower which is normally switched off and can be switched on by the control means at arbitrarily determined time intervals or at time intervals determined by specific parameter values inside, respectively, outside the container, particularly the temperature and/or the humidity (relative air humidity) for a predetermined period of function time or for a period of function time that is dependent from the parameter values.

By the arrangement according to the invention, respectively, by the inventive process it is ensured that the nitrogen that is introduced in order to adjust the atmospheric composition can be delivered into the cool room at a temperature that essentially corresponds to the temperature within the cool room, respectively, is approximately no more than 5% lower. Thereby it is avoided that goods are destroyed because of cold damage caused by introducing nitrogen at too low temperature. The transportation of the nitrogen in liquid form within containers is selected because this form of carrying the nitrogen along ensures a greatest possible supply of nitrogen, compared with a storage of the nitrogen carried along in pressure tanks. The energy required for cooling is supplied by a cooling system that is driven, for example, by gasoline, diesel oil or the like, which cooling system cools the atmosphere within the container in that this atmosphere is circulated via the cooling system.

It is particularly advantageous and economical from energy considerations, if the means used for heating the nitrogen comprises at least one heat exchanger disposed outside the refrigerated container, the heat exchanger being in thermal contact with the ambient air, respectively, is disposed within the streaming ambient air and/or comprises at least one heat exchanger that is disposed in the cooling-agent line between the compressor and the condenser of the cooling system or which is in thermal contact with the cooling-agent condenser. This improves the energy balance of the refrigerated container, since means for heating the nitrogen, for example electrical heating systems can be eliminated; the energy required for heating the nitrogen is supplied by the cooling system or the ambient air. Finally, significant losses of nitrogen are avoided if the blow-off line of the containers for the liquid nitrogen is passed into the interior of the cool room. Thus, the amount of nitrogen usually discharged to the environment is used, this resulting in an extended storage time that is independent of nitrogen filling stations.

The following description, the drawings and the subclaims contain advantages embodiments of the invention.

Examples of the invention will be further illustrated by way of the drawings.

Figures 2, 10:
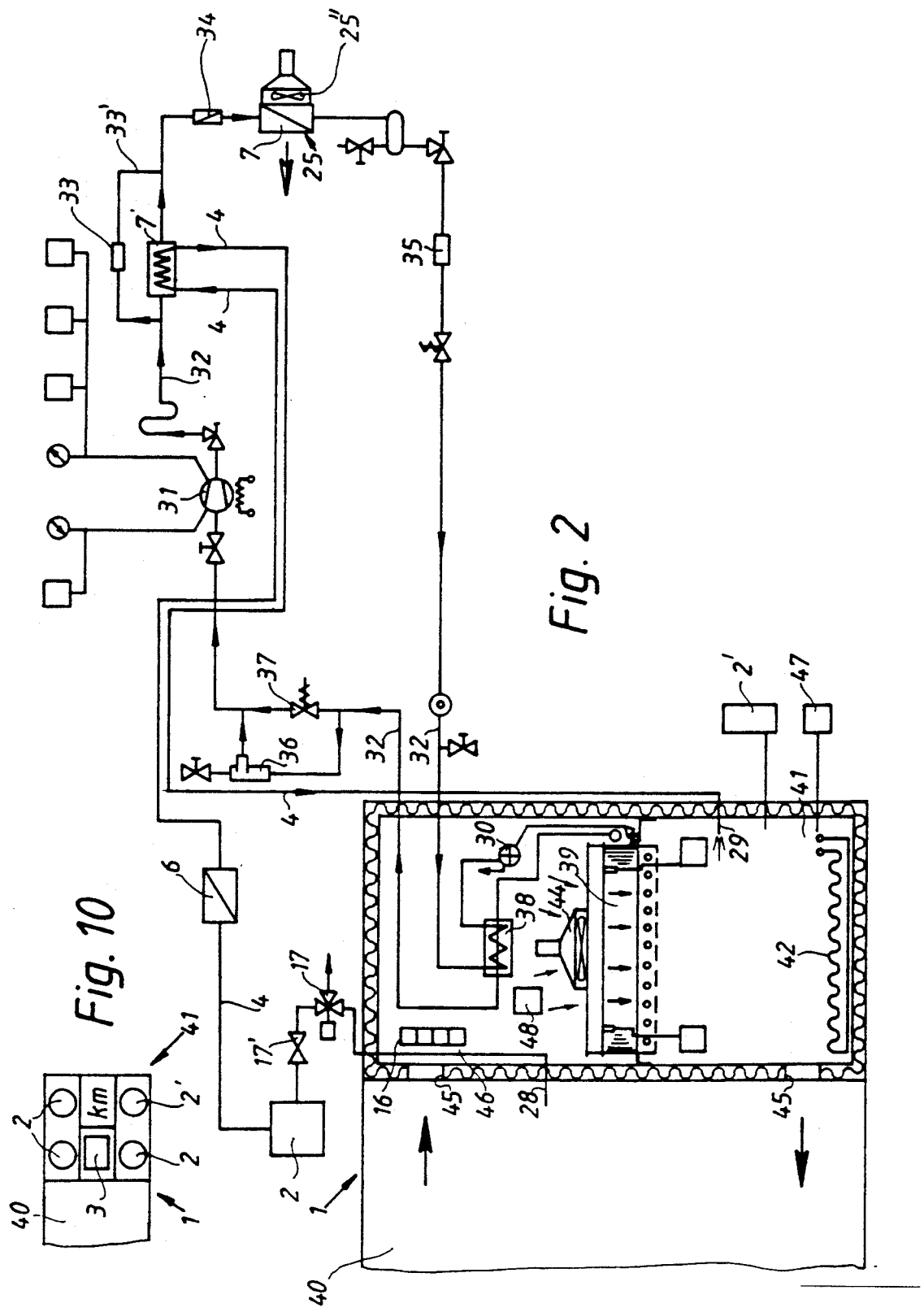

FIGS. 1 and 2 show schematic principle diagrams (in part in vertical cross-section) of a refrigerated container according to the present invention, FIGS. 3 to 7 show various schematic embodiments of the heat exchanger arrangements, FIGS. 8 and 9 show two embodiments of heat exchangers and FIG. 10 shows a schematic cross-section from above.

FIG. 1 shows schematically a refrigerated container 1 with a machinery chamber 41 and a cool room 40 into which nitrogen is delivered through a line 4 from containers 2 in which liquid nitrogen is contained. At the beginning of the storage period the liquid nitrogen is fed into the containers 2 through a filler valve 18 and corresponding lines 19' that incorporate, inter alia, a non-return flap 30'. By 18 a vent valve is designated and by 17. The components used to store the liquid nitrogen and to transfer nitrogen into the cool room 40 are collectively referred to as the liquid nitrogen source,-three-way solenoid valve, preceded by an over-pressure safety valve 17'.

FIG. 10 shows schematically that the machinery chamber 41 adjoins the cool room 40, respectively, is attached to it. Within the machinery chamber 41 there are disposed three containers 2 for $N_2$ and a container 2' for $CO_2$. The cooling system 3, together with sensors, is disposed separately in a compartment and circulates the atmosphere within the cool room 40. The control unit, the condenser of the cooling system and other components are arranged in one or more additional compartment(s) (Km). FIG. 1 shows schematically how the return air is passed via the cooling system 3 and is supplied to the cool room 40 as cooled feed air.

The maintenance of the pressure, the composition, and the temperature of the atmosphere within the cool room 40 is controlled by means of a computer 13 which interrogates measuring instruments 20, respectively, a sensor box 16 and controls all valves, control- and adjusting means for the container parameters, respectively, which is connected to all sensors, for example gas-, pressure- and temperature sensors within the interior of the container. Further, the computer monitors the outside temperature, parking times and so on and is thus able to control the overall cooling sequence insofar as it has access to all the regulating units. The nitrogen required for calibrating the sensor box 16, respectively, for the measuring instruments is drawn off from the containers 2 through a line 12 which includes a heat exchanger 11 within which the nitrogen is warmed by means of thermal contact with the ambient air. The nitrogen flows within the line 12 through a choke 23 to a three-way valve 21 which connects the line 12 or the line 14, through which ambient air can be drawn in, via a shut-off valve 22 to the sensor box 16, which in its turn can be connected via a further shut-off valve 22 and a line 15 to the atmosphere within the cool room 40 so that the sensor box can effect comparative measurements by using nitrogen/ambient air and the atmosphere within the cool room.

At the same time, the line 12, respectively, the pressure within it serves for the pressure control of a pneumatic valve 9 through the line 10, which pneumatic valve 9 can open, close and adjust a low-temperature valve 8 disposed in the line 4.

In FIG. 1, the line 4 passes through a heat exchanger 6 for heat exchange with the ambient air, and through a heat exchanger 7' disposed in the circuit 32 of the cooling agent of the cooling system 3. By 32 the cooling-agent lines are designated which contain cooling-agent that has been compressed by the compressor of the cooling system 3, i.e., warm cooling-agent. The line 4 opens up into the cool room 40 of the container through a nozzle 29. It would also be possible to dispose the nozzle or a choke or a system comparable therewith already outside the cool room in the line 4, if desired also preceding the heat exchangers 6 or 7', respectively.

The line 28 passes into the cool room 40 of the container 1 via the safety valve 17' and the gas blow-off valve 17 that is connected through the line 17" with the ambient air, by which line 28 the nitrogen that is constantly evaporating within the containers 2 can be delivered into the storage room 40, controlled by the control system 13. In the event that it is unnecessary to introduce $N_2$ into the cool room, the $N_2$ is delivered to the environments through 17". The line 28 could also pass through the heat exchanger 6 or the heat exchanger 7', respectively, as it is indicated by 28' in dashed lines, in order to impart a higher temperature to the nitrogen passed therethrough. By 43 an over-pressure valve for the cool room 1 is designated.

FIG. 2 shows schematically a container 1 divided into a cool room 40 which, if desired, is provided also with a heater 42 (for example for rapid warming of the goods), and into a machinery chamber 41 within which (see FIG. 10) the cooling system 3, the nitrogen containers 2, the $CO_2$-container 2', the control means 13 and the other technical systems are disposed. The line 28 for the nitrogen that evaporates naturally within the containers 2 passes from the nitrogen containers 2 located in the machinery chamber 41, via the valves 17,17' into the cool room 40 and/or the machinery chamber 41. $CO_2$ is introduced into the machinery chamber 41 and/or into the cool room 40, the introduction can take place before or after the evaporator 39, respectively, in the supply- and/or return flow. Nitrogen at a temperature which essentially corresponds to the temperature in the cool room 40, is fed into the cool room through the line 4, the heat exchanger 6, the heat exchanger 7' and via the choke, respectively, nozzle 29. The atmosphere within the container is circulated through the evaporator 39 of the cooling system 3 by means of an evaporator blower 44 and is delivered into the cool room 40, respectively, is removed therefrom, through channels 45 indicated. Advantageously, the circulation of the atmosphere is effected via the evaporator 39 of the cooling system 3 from top to bottom, respectively, substantially vertically.

An evaporation pressure regulator 38 is arranged in the line 32 for the cooling agent, this regulator being connected in parallel to a by-pass valve 37. Downstream in the direction of flow, there is disposed a compressor 31 from which heated and compressed cooling-agent passes to the heat exchanger 7' to which a by-pass 33 is connected in parallel. Subsequently, the line 32 passes through a non-return valve 34 and the heat exchanger 7 that is in thermal contact with the condenser 25 of the cooling system, through which heat exchanger ambient air is passed by means of a condenser blower 25'. The cooling-agent is passed to the evaporator 39 through an expansion valve 30, through a dryer 35 and a pre-heat exchanger 38, and is then passed on through the circulatory system.

The arrangement of a by-pass line 33' for the heat exchanger 7' is necessary because if the compressor 31 stops, the nitrogen that is fed through the line 4 into the cool room 40, could cause the cooling agent to solidify in the line 32, respectively, could cause the line to become plugged, and, when the compressor 31 begins to operate again, the line 32, respectively, other components could become damaged because of excessive pressure. Therefore, the over-pressure valve 33 is disposed in the by-pass line 33' and opens when a certain pressure is reached in the line 32. As soon as the compressor begins to operate, the cooling agent that has been compressed by the compressor warms the solidified cooling agent in the heat exchanger 7', whereupon the path through the heat exchanger 7 is once again opened up, whereupon the by-pass valve 33 closes and the entire amount of cooling-agent streams through the heat exchanger 7'. Accordingly, the by-pass line 33' is led close enough to the heat exchanger 7', so that, on the one hand, this line cannot freeze and, on the other hand, the heat exchanger 7' can be thawed by this line.

FIG. 3 shows schematically a device for warming the nitrogen, in which the nitrogen is conducted from the nitrogen container 2 into the cool room of the refrigerated container 1. The line 4 passes via a heat exchanger 8 for thermal contact with the ambient air, which heat exchanger can be acted on by a blower 24.

FIG. 4 shows a system with a heat exchanger 7' in which there is a thermal exchange between the cooling agent that passes from the cooling system 3, respectively, from the compressor 31 via the line 32 to the condenser 25, and the nitrogen that is conducted in the line 4. A by-pass line 33' having a by-pass valve 33 is associated to the heat exchanger 7'.

FIG. 5 shows a system in which a heat exchanger 7 is disposed in the nitrogen line 4, which heat exchanger is combined with the condenser 25 of the cooling system 3 to form a structural unit and is acted on by ambient air by means of a blower, particularly the condenser blower 25".

FIG. 6 shows a system in which a heat exchanger 7 is disposed for contact with the ambient air 6, which heat exchanger, if desired, is acted on with ambient air by a blower 24. Further, a heat exchanger 7' is arranged in the line 4, which heat exchanger is located in the cooling agent circulatory system between the compressor 31 and the condenser 25, and, if desired, is acted on with ambient air by a blower 24 in order to heat the nitrogen in the line 4.

FIG. 7 shows an arrangement in which a heat exchanger 6 acted upon by a blower 24 is disposed in the line 4 to provide for a thermal exchange with ambient air, and in which further a structural unit 7 is provided consisting of a heat exchanger and the condenser 25, which unit is acted on by a blower 25', in particular by the condenser blower.

FIG. 8 shows an arrangement in which two heat exchangers, particularly in form of gilled tubes, respectively, grids or plates are combined to form a structure 7' through which air is caused to stream by means of a blower 25'. Alternative to this, according to FIG. 9 also an arrangement could be provided in which the cooling-agent line 32 passes through a container through which nitrogen streams from the nitrogen line 4.

According to the invention, also other systems for heating the nitrogen in the line 4 can be used. Heat exchangers to provide for thermal contact with the ambient air as well as the heat exchangers for heat exchange with the cooling agent circulating in the line 32 can be of any shape. In the same way, the configuration, respectively, the structure of the structural unit which represents a combination of the heat exchanger for the nitrogen with the condenser 25 of the cooling-agent system 3 can be selected by one skilled in the art. Of course, one would design such heat exchangers from the viewpoint of achieving the best possible thermal exchange.

In the present invention, it is not the cold energy of the transported nitrogen that is used for cooling, but rather liquid nitrogen is used in order to be able to carry along the greatest possible quantity of nitrogen. By regulating the nitrogen temperature, respectively, by heating the nitrogen to a value that is only for a small amount below the temperature within the cool room 40, in a certain manner also the cooling effect of the nitrogen, respectively, its cold energy, is used without affecting the goods stored in the cool room 40. The throughput of the nitrogen, respectively, of the cooling-agent through the heat exchanger and/or the power of the blowers 24,25', the efficiency of the cooling system, the opening and closing of the feed valves etc., is controlled by the control means 13. For example, a temperature regulation of the supplied nitrogen can be effected by the valve, respectively, the choke 29, which restricts, respectively, controls the flow of the nitrogen, in that the nitrogen passes through the heat exchangers more quickly or more slowly. The choke 29 regulates the pressure of the nitrogen in the line 4, respectively, the consumption and is controlled by the computer 13. In the same way, the temperature of the nitrogen can be adjusted to the temperature in the cool room by regulating the speed of the blowers 24 and 25'. In an advantageous manner, the blowers 24 and 25' are allowed to run such that in combined units of heat exchanger and condenser or heat exchanger and cooling-agent line 32 a stoppage, respectively, solidification of the cooling-agent 32 is avoided.

If the nitrogen is supplied through the line 28, the same precautions relative to the heat exchangers can be applied in this line as provided in the line 4. The line 28 can, like the line 4, be passed via external heat exchangers, respectively, heat exchangers associated to the condenser 25, respectively, heat exchangers located in the cooling-agent line 32.

It has been found in practice that the nitrogen losses which result from leakage from the container 1 can to a great extent be made up by the amount of nitrogen that evaporates from the containers 2 which, according to the invention, has been used to adjust the atmosphere, respectively, has been introduced into the cool room 40, however, which can also be introduced into the chamber 41 and from there into the cool room.

On initial charging, one proceeds such that the container, filled with normal atmosphere, is pre-cooled, the goods then being sorted therein and that then nitrogen is applied, respectively, the container atmosphere is adjusted and it is cooled, which process lasts for about 6 hours.

The computer, respectively, the sensor box 16 measures, inter alia, the content of nitrogen, $CO_2$, argon, ethylene etc., in the cool room. By 46 sensors for $O_2$, $CO_2$, the room humidity $R_T$ etc. are designated which sensors can be disposed in the cool room 40, respectively, in the machinery chamber 41 in the pass of flow, particularly upstream from the evaporator, respectively, from the evaporator blower 44, respectively, advantageously, ahead of the outlet for the return air.

The adjustment of the composition of the atmosphere of the inventive refrigerated container is preferably effected such that the $N_2$-content of the atmosphere is adjusted with the $N_2$ carried along, excessive oxygen is flushed out, preferably with $N_2$. The $CO_2$-content is adjusted, preferably by means of a $CO_2$-scrubber, respectively, a molecular sieve 48, respectively, by supply of $CO_2$ from the container 2' carried along. An $O_2$-content that is too small is made up by the supply of ambient air using a supply system 47, a pump. Other atmospheric components (ethylene, argon) that are to be adjusted can be regulated by flushing with $N_2$ or by supply from special containers. All of the adjusting-and regulating processes are effected by the control system.

Not shown in the drawings is a control unit for the optionally provided regulation of the heating systems for the nitrogen. According to the invention it is provided that a valve is provided in the by-pass line which opens at a pre-selected pressure in the cooling-agent line. Further, it can be foreseen that the control system regulates the supply of air to the heat exchangers, for example by means of adjustable air louvers, speed control systems for the blowers or the like. The degree to which the nitrogen is heated can be matched to the cooling parameters, respectively, to the cooling conditions, and the quantity and/or the pressure of the $N_2$ to be supplied can be adjusted by the control unit.

We claim:

1. Apparatus for storing perishable goods in a refrigerated state comprising a cool room for storing said perishable goods, control means connected with said cool room, said control means being adapted to control separately the atmospheric composition, and the internal temperature, of said cool room, p1 a liquid nitrogen source connected with said cool room and said control means, liquid nitrogen from said source being used substantially only to modify the atmospheric composition of said cool room, and not to change substantially the temperature of said cool room, a warming system connected with said control means and said liquid nitrogen source, said warming system being adapted to warm nitrogen from said source to a temperature substantially corresponding to the internal temperature of said cool room, that nitrogen being so warmed before it is introduced into said cool room to modify the atmospheric composition of said cool room, said warming system thereby permitting the nitrogen to be introduced into said cool room at a warmed temperature which does not significantly damage perishable goods within said cool room, and a cooling system connected with said cool room and said control means, said cooling system being adapted to cool the internal temperature of said cool room independent of said liquid nitrogen.

2. The apparatus of claim 1, said warming system comprising at least one heat exchanger located outside said cool room.

3. The apparatus of claim 2 wherein said heat exchanger is in thermal contact with ambient air.

4. The apparatus of claim 2, said warming system comprising at least one heat exchanger outside said cool room, said heat exchanger being located in a cooling agent line between a compressor and a condenser of said cooling system, said heat exchanger thereby being exposed to heat generated by said compressor and said condenser to warm said nitrogen.

5. The apparatus of claim 2, said warming system comprising at least one heat exchanger outside said cool room, said heat exchanger being located in a cooling agent line of said cooling system and in thermal contact with a condenser of said cooling system, said heat exchanger thereby being exposed to heat generated by said condenser to warm nitrogen from said liquid nitrogen source.

6. The apparatus of claim 2, said warming system comprising a first heat exchanger outside said cool room in thermal contact with ambient air, and a second heat exchanger in line with and following said first heat exchanger for thermal exchange with a cooling agent in said cooling system, said first and second heat exchangers being exposed to heat respectively from said ambient air and said cooling agent to warm nitrogen from said liquid nitrogen source.

7. The apparatus of claim 2, said warming system comprising at least one heat exchanger in thermal contact with a cooling agent line and a line in said liquid nitrogen source for transferring nitrogen from said storage container to said cool room, said line for transferring nitrogen thereby being exposed to heat in said cooling agent line to warm said nitrogen.

8. The apparatus of claim 7, said warming system further comprising a bypass line connected to said cooling agent line bridging said heat exchanger, whereby cooling agent can flow in the event of blockage in said cooling agent line in said heat exchanger.

9. The apparatus of claim 3, said ambient air being circulated by a condenser blower of said cooling system.

10. The apparatus of claim 1, said nitrogen after warming being conducted into said cool room by a transfer line terminating with a choke means.

11. The apparatus of claim 10, said choke means comprising one of a nozzle and a regulatable valve.

12. The apparatus of claim 1, said liquid nitrogen source further comprising a vent line connected to said warming system which passes into the interior of said cool room.

13. The apparatus of claim 1, said apparatus comprising a blower for circulating atmosphere within the interior of said cool room, and activation means for activating said blower at one of arbitrarily determined time intervals, and at intervals determined by specific parameter values.

14. The apparatus of claim 13, said specific parameters including temperature and relative air humidity both inside and outside said apparatus.

15. The apparatus of claim 1, said control means further comprising a computer connected to gas, pressure and temperature sensors for determining specific parameter values, and for directing adjustment of the atmospheric composition and the internal temperature of said cool room in response to said specific parameter values.

16. A process for storing perishable goods in a refrigerated state comprising adjusting the atmospheric composition in a cool room by introducing nitrogen thereinto, said nitrogen being heated by a warming system prior to introduction into said cool room to a temperature substantially corresponding to the internal temperature of said cool room, thereby permitting the nitrogen to be introduced into said cool room at a temperature which does not significantly damage perishable goods within said cool room due to the introduction of the warmed nitrogen, and cooling said atmosphere in said cool room by means of a cooling system which circulates said atmosphere, said cooling being substantially independent of said adjusting step.

17. The process of claim 16 wherein the temperature of the heated nitrogen is slightly lower than the temperature within said cool room.

18. The process of claim 17 wherein the temperature of the heated nitrogen no more than about 5% lower than the temperature of said cool room.

19. The process of claim 16 wherein the nitrogen introduced into said cool room is warmed prior to introduction by thermal contact with ambient air.

20. The process of claim 16 wherein the nitrogen introduced into said cool room is warmed prior to introduction by thermal contact with air passed via the compressor of said cooling system.

21. The process of claim 16 wherein nitrogen introduced into said cool room is warmed prior to introduction by thermal contact with air passed via the condenser of said cooling system.

22. The process of claim 16 wherein the pressure of nitrogen introduced into said cool room is matched to the interior atmospheric pressure of said cool room.

* * * * *

UNITED STATES PATENT AND TRADEMARK OFFICE
CERTIFICATE OF CORRECTION

PATENT NO. : 5,172,558
DATED : December 22, 1992
INVENTOR(S) : Rudiger Wassibauer et al It is certified that error appears in the above-identified patent and that said Letters Patent is hereby corrected as shown below:

Column 4, line 6, delete "$2^7$" and insert --$2'$--

Signed and Sealed this

First Day of February, 1994

BRUCE LEHMAN

*Attest:*

*Attesting Officer*         *Commissioner of Patents and Trademarks*